United States Patent [19]

Kunz

[11] Patent Number: 4,993,292
[45] Date of Patent: Feb. 19, 1991

[54] NOTCHING MACHINE

[75] Inventor: Peter Kunz, Wiesenring, Fed. Rep. of Germany

[73] Assignee: Ludwig Boschert Maschinen-und Apparatebau GmbH & Co KG, Lorrach-Hauingen, Fed. Rep. of Germany

[21] Appl. No.: 422,688

[22] Filed: Oct. 17, 1989

[30] Foreign Application Priority Data

Oct. 20, 1988 [DE] Fed. Rep. of Germany .... 3835775.5

[51] Int. Cl.$^5$ ............................................. B21D 28/02
[52] U.S. Cl. ..................................... 83/76.1; 83/76.7;
83/559; 83/917; 83/620
[58] Field of Search .................. 83/400, 76.1, 76.6, 83/76.7, 76.9, 559, 620; 183/917

[56] References Cited

U.S. PATENT DOCUMENTS

| | | | |
|---|---|---|---|
| 2,548,427 | 4/1951 | Fernbach | 83/400 |
| 4,331,050 | 5/1982 | Gergek | 83/76.7 |
| 4,535,665 | 8/1985 | Fazis | 83/559 |

FOREIGN PATENT DOCUMENTS

| | | | |
|---|---|---|---|
| 3433658 | 11/1987 | Fed. Rep. of Germany . | |
| 0141337 | 11/1980 | Japan | 83/559 |
| 0157533 | 9/1983 | Japan | 83/76.1 |

*Primary Examiner*—Hien H. Phan
*Assistant Examiner*—John M. Husar
*Attorney, Agent, or Firm*—Ratner & Prestia

[57] ABSTRACT

In a notching machine having two set collars for mounting the upper and lower knives of a blade assembly a common turning of the same around a vertical axis of rotation is controlled by an electric motor driven angular drive adjustment mechanism that includes a shaft brake mechanism for braking a pivot member of the two set collars in each of two angularly different turning positions that are counted by a pulse generator which is referenced to a rotational zero reference position. A program control unit controls two successive working strokes of a ram in such two angularly different turning positions.

4 Claims, 2 Drawing Sheets

NOTCHING MACHINE

FIELD OF THE INVENTION

This invention relates to a notching machine in which workpieces may be notched with any desired notching angle.

BACKGROUND ART

A prior art notching machine of the kind as herein referred is described in German Patent No. 34 33 658. In this known notching machine an angular drive adjustment mechanism is being used for adjusting successively two angularly different turning positions of a pair of upper and lower set collars. The two set collars carry the upper and lower knives of a blade assembly which have a predetermined coinciding minimum vertex angle. Whenever a notching of workpieces with a notching angle greater than this minimum vertex angle is being desired it therefore becomes necessary to effect a notching of the workpieces in such two angularly different turning positions of the blade assembly with two correspondingly successive working strokes of the vertically moving ram of the notching machine carrying the upper set collar with the upper knife.

The lower set collar carrying the lower knife forms an auxiliary table plane-parallel with the machine table. It has a hollow pivot member which carries a coaxially mounted ring gear. The same forms the final gear of a gearing which is a part of the angular drive adjustment mechanism driven by a numerically controlled direct current motor. The gearing also comprises a pinion meshing with this rather very large sized ring gear. Both gears as well as a support bearing for the hollow pivot member are arranged in a common lubrication chamber of the machine table. The bearing is supported by a tubular member which forms an axial extension of the hollow pivot member and communicates with a lower ejection opening for the clippings.

With an angular drive adjustment mechanism incorporating such a large sized ring gear and used for commonly turning the two set collars and the blade assembly whenever a notching angle greater than the vertex angle is being desired it becomes necessary to first move and later brake again correspondingly large centrifugal masses after each working stroke of the ram. This causes some serious problems for precisely approaching the two successive turning positions of the two set collars. The numerically controlled direct-current motor is therefore realized with a correspondingly expensive voltage control.

This invention accordingly deals with the object of providing a notching machine which uses a less expensive angular drive adjustment mechanism. The notching machine shall also allow a less critical approach of the two angularly different turning positions of the two set collars whenever a notching angle greater than the minimum vertex angle of the blade assembly is being chosen for the notching of workpieces.

SUMMARY OF THE INVENTION

According to the present invention, there is provided a notching machine which has a shaft brake that is mounted on the pivot member of the lower set collar for arbitrarily braking the gearing which forms a part of an angular drive adjustment mechanism. A program control unit controls the successive working strokes of the ram as well as also this shaft brake in such a manner that the shaft brake is activated in each of the two angularly different turning positions of the two set collars and will be deactivated in between for allowing a turning of the two set collars from a first to a second turning position. A pulse generator controls the off-time of an electric driving motor in both turning positions of the two set collars whereby this pulse generator is arranged for angularly counting the rotation of the pivot member with respect to a predetermined zero reference position and for thusly recording the two angularly different turning positions for their proper control by the program control unit.

The present invention accordingly provides a notching machine which due to the presence of the shaft brake and its particular control including the pulse generator for controlling the off-time of the electric driving motor is less expensive and also less problematic as concerns a very precise approach of both angularly different turning positions of the two set collars and accordingly of the blade assembly whenever a notching of workpieces with a notching angle greater than the vertex angle is being desired This higher precision which now is made possible is primarily due to the fact that the control of the two angularly different turning positions is realized on the driven side of the two set collars by means of said shaft brake and therefore no longer on the driving side as it is realized in the known notching machines.

DETAILED DESCRIPTION OF THE INVENTION

The notching machine of this invention may for example be realized with a notching machine as described in U.S. Pat. No. 4,129,054 and also incorporating constructional details of a notching machine as described in U.S. Pat. No. 4,535,665 both issued in the name of the assignee of this invention. A notching machine of this kind may be used for notching workpieces with varying angles for example between 30° and 120° whereby the minimum notching angle of 30° forms at the same time the minimum vertex angle of a pair of upper and lower knives of a blade assembly of the notching machine.

Figure 1:
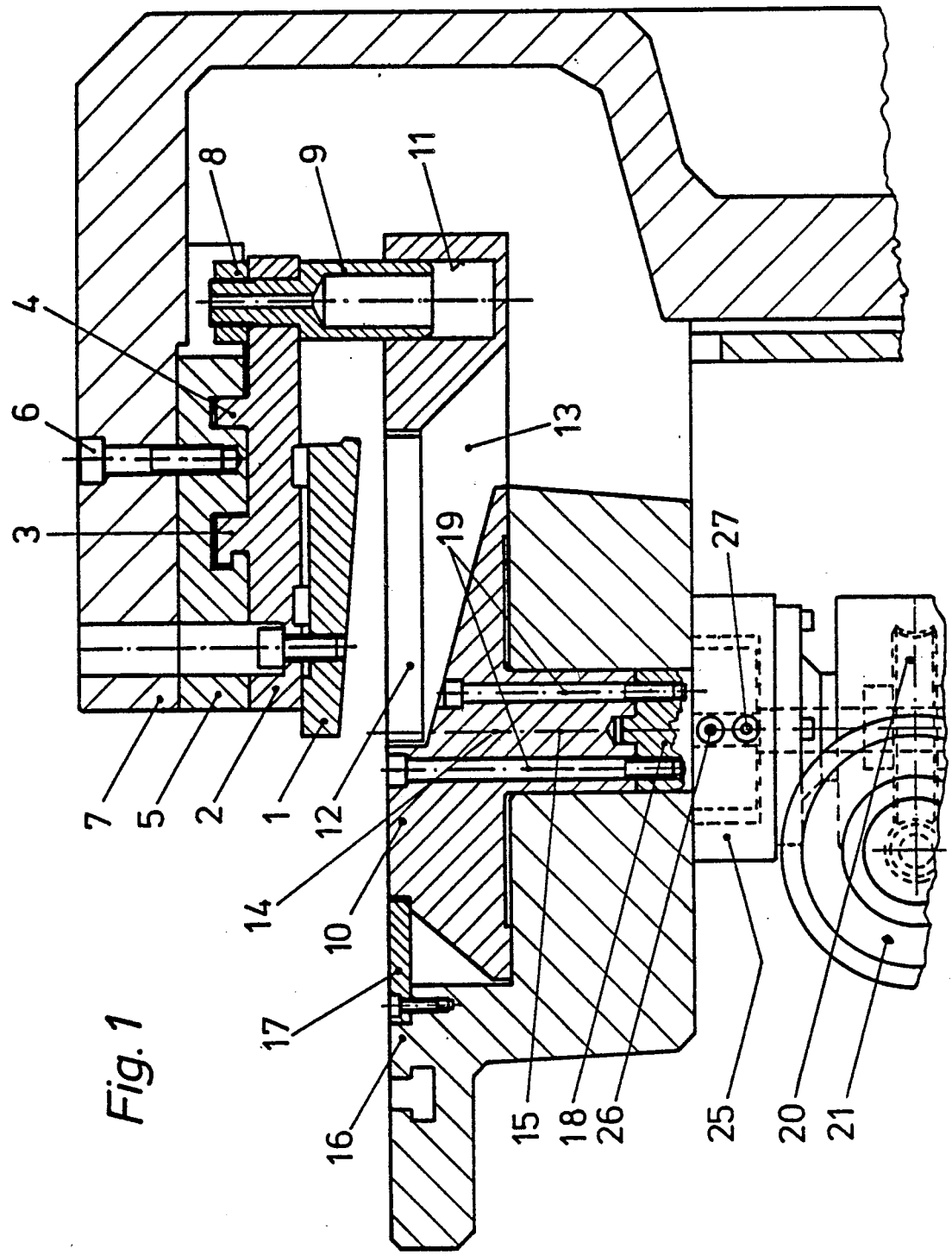
FIG. 1 is a cross-sectional view of the notching machine according to the present invention.

As shown in FIG. 1 the upper knife 1 of such a blade assembly is attached to an upper set collar 2 by means of bolts. The upper set collar 2 has a retaining web 3 with an enlarged guide head as well as a spaced apart guide rail 4 both of which engage complementary guide grooves that are formed in a mounting plate 5. The mounting plate 5 is attached to a projecting head 7 of a vertically moving ram by means of bolts 6. The upper set collar 2 also carries a rigid axis 9 that extends in parallel with the longitudinal axis of the ram and is attached by means of a union nut 8 for obtaining a rigid connection with a lower set collar 10 having a dead end bore 11 for engagement with the lower end of this rigid axis. This dead end bore 11 forms at the same time an oil reservoir for a lubrication of the rigid axis.

The lower set collar 10 carries the lower knife 12 of the blade assembly. An ejector opening 13 for the clippings is provided below this lower knife 12 which has the same vertex angle as the upper knife 1. The lower set collar 10 has a vertical axis of rotation 14 which is formed by a pivot member 15 that is inserted in a bore of the machine table 16. It forms an auxiliary table which is plane-parallel with the machine table due to its support within a recess the bottom of which has an opening as aligned with the ejector opening 13. With a rotation of the lower set collar 10 around the rotational axis 14 a concurrent rotation of the upper set collar 2 due to the rigid interconnection through the rigid axis 9 will be obtained so that the two knives 1 and 12 of the blade assembly will accordingly also be turned around the same axis whenever a rotation of the lower set collar 10 is being initiated.

Figure 2:
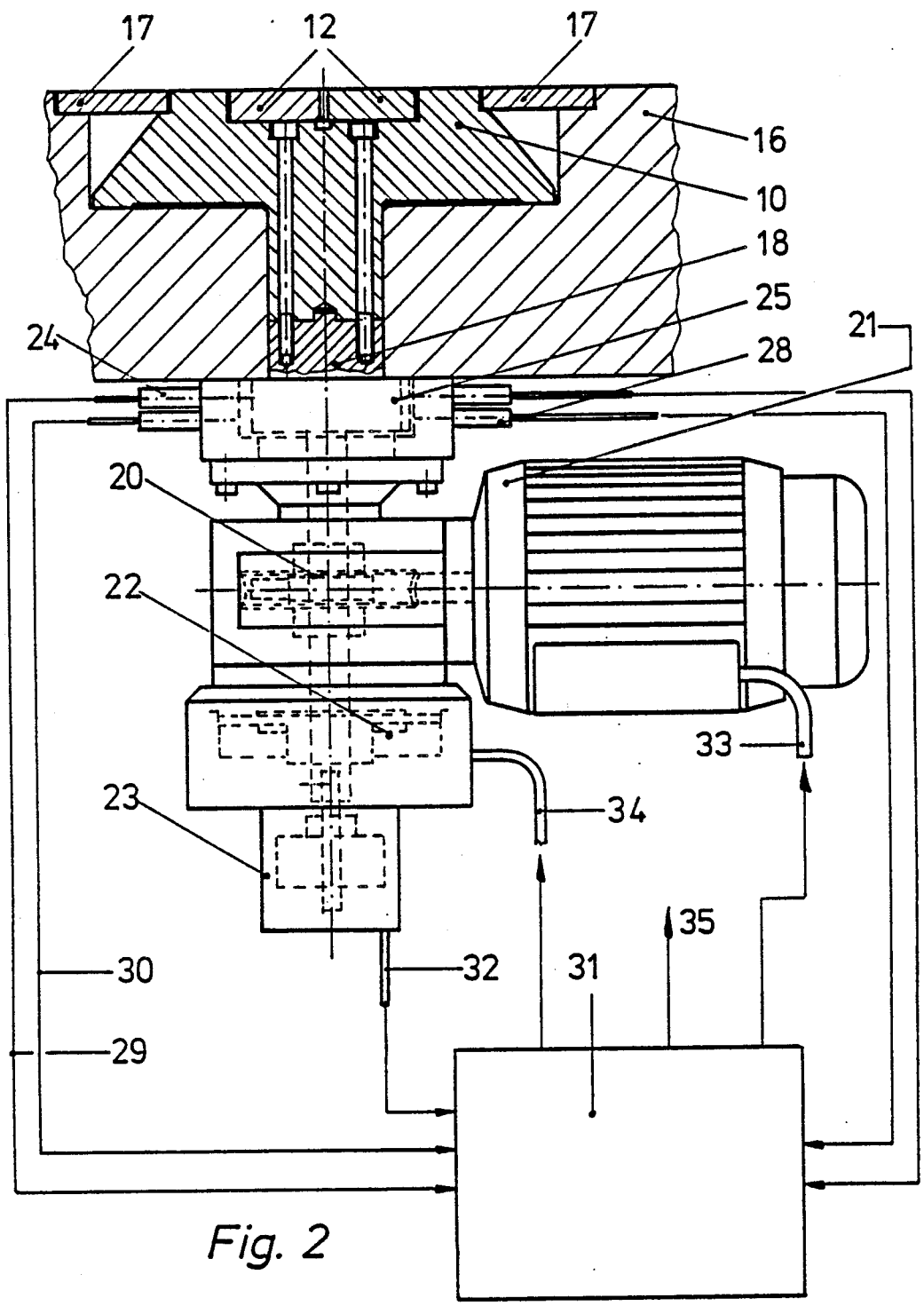
FIG. 2 is a schematic representation of the angular drive adjustment mechanism which is used in the notching machine according to FIG. 1.

It of course has to be understood that such a common rotation of the two set collars 2,10 is guided by the engagement of the retaining web 3 and the guide rail 4 with their coordinated grooves formed in the mounting plate 5. These grooves extend concentrically with the axis of rotation 14 with which also an angle scale 17 covering the recess of the machine table on the working side of the machine is concentrically arranged. This angle scale 17 is provided with a reading between 0° and 180°. As long as workpieces are to be notched with a notching angle corresponding with the minimum vertex angle of the two knives 1,12 this notching may be effected with a single working stroke of the ram. For all notching angles greater than this minimum vertex angle of for example 30° the workpieces must then be notched with two successive working strokes of the ram in two angularly different turning positions of the two knives whereby such two different turning positions are first to be adjusted by means of the particular angular drive adjustment mechanism which will now be described in more detail by reference to FIG. 2.

The pivot member 15 of the lower set collar 10 is extended by a shaft 18 as secured by means of bolts 19 whereby this shaft could also be formed in one piece with the pivot member 15. A worm gear 20 is rigidly connected to shaft 18 and is driven by a rotary current motor 21 through an intermediate worm. Shaft 18 further carries a disk brake 22 forming a shaft brake which when activated through an electrical control stops any rotation of the shaft 18 and therefore also any rotation of the lower set collar 10 and its interconnected upper set collar 2 both of which carry the two knives of the blade assembly. Shaft 18 finally also carries a pulse generator 23 that is arranged for counting the rotation of the shaft 18 with respect to a predetermined zero reference position which may be preselected by means of a reference switch 24. The reference switch 24 is mounted on a flange bearing 25 carrying the shaft 18 so as to cooperate with a contact maker 26 which is fixed on the shaft 18. A second contact maker 27 also fixed on the shaft 18 cooperates with a second signal generator 28 for controlling a maximum turning position of the two set collars which corresponds to a maximum notching angle of for example 150° as available with the particular adjustment mechanism.

The reference switch 24 and the signal generator 28 are connected with a program control unit 31 via signal lines 29 and 30. A further signal line 32 also connects the pulse generator 23 with the program control unit 31 which has an input keyboard for preselecting any desired notching angle. Any notching angle greater than the vertex angle of the two knives of the blade assembly will accordingly be controlled by this program control unit 31 with two correspondingly different angular turning positions of the two set collars 2 and 10 as soon as the zero reference position has received the corresponding input from the reference switch 24 via the signal line 29 and of course as soon as the particular notching angle has been preselected by means of such an input keyboard. A corresponding starting signal will then be delivered via signal line 33 to the rotary current motor 21 so that with this starting signal the shaft 18 will be moved for a rotation of the two set collars 2 and 10. An enabling signal is being delivered at the same time through signal line 34 to the shaft brake 22 so that the shaft will be free for its rotation by means of the motor driven worm meshing with the worm gear 20. When the shaft 18 starts with its rotation then the pulse generator 23 concurrently begins with its angular counting of the shaft rotation. The counting signal which is delivered via the signal line 32 to the program control unit 31 may at the same time receive a visible indication on a display unit by means of an upward counter. As soon as a first predetermined turning position of the two set collars has been reached a switch-off signal will then be delivered via signal line 33 to the motor 21. At the same time an enabling signal for the activation of the shaft brake 22 is delivered via signal line 34. The two set collars 2 and 10 now remain in their rest position. A working signal may now be delivered from the program control unit 31 via signal line 35 to the drive means of the ram so that in the first turning position of the blade assembly a first working stroke for a notching of a workpiece will be made possible. The shaft brake 22 will again be deactivated after this first working stroke so that with a successive switching-on of the motor 21 the second turning position of the blade assembly will be controlled in the same manner. The final notching of the workpiece will then be made with a second working stroke of the ram as successively controlled by the program control unit.

It should be understood that the rotational speed of the rotary current motor may be varied between a fast speed at the beginning and a creep speed at the end so that each turning position of the two set collars is approached with a correspondingly high precision. The shaft brake may be of any conventional design for either pneumatically or hydraulically or electromagnetically braking the rotation of the two set collars on the driven side of the particular angular drive adjustment mechanism.

What is claimed is:

1. A notching machine having a vertically moving ram provided with a projecting head holding an upper knife of a blade assembly which also has a lower knife that is attached to a machine table, said upper and lower knives mounted on upper and lower set collars which may be turned in common around a vertical axis of rotation in common with a central pivot member of said lower set collar, extending in parallel with the longitudinal axis of said ram, by means of an angular drive adjustment mechanism having a central pivot member and whereby each notching of a workpiece with a notching angle greater than a predetermined coinciding vertex angle of said upper and lower knives with respect to a predetermined zero reference position is accomplished by a first and a successive second working stroke of said ram in two angularly different turning positions of said upper and lower set collars up to a maximum notching angle, said notching machine further comprising:

an electric motor;

an angular gear mechanism with a final gear on said central pivot member and directly driven by said electric motor with no clutch;

a shaft brake means on said central pivot member for braking said upper and lower set collars when rotating;

a program control unit for controlling said successive first and second working strokes of said ram and for synchronously controlling said shaft brake means and said electric motor, said program control unit activating said shaft brake means and switching-off said electric motor in each of said two angularly different turning positions of said upper and lower set collars and said program control unit deactivating shaft brake means and switching on said electric motor only after said first working stroke of said ram to turn said upper and lower set collars from said first to said second turning position; and a pulse generator for controlling said electric motor in both of said turning positions of said upper and lower set collars, said pulse generator counting the angular rotation of said central pivot member with respect to said predetermined zero reference position for recording each of said two angularly different turning positions of said upper and lower set collars.

2. A notching machine according to claim 1 in which said shaft brake means and said pulse generator form a preassembled drive unit which is mounted on a shaft together with the final gear of said angular gear mechanism, said shaft which is connected to said central pivot member.

3. A notching machine according to claim 1 in which said central pivot member is carried by a flange bearing which is connected to said machine table and on which is mounted a first signal generator for indicating said predetermined zero reference position.

4. A notching machine according to claim 3 in which a second signal generator is mounted on said flange bearing for controlling said maximum notching angle of said upper and lower set collars.

* * * * *